United States Patent
Harrison

(10) Patent No.: US 7,219,226 B2
(45) Date of Patent: May 15, 2007

(54) METHOD AND APPARATUS FOR ENCRYPTING DATA

(75) Inventor: Keith Alexander Harrison, Woodcroft Chepstow Monmouthshire (GB)

(73) Assignee: Hewlett-Packard Company, Palo Alto, CA (US)

( * ) Notice: Subject to any disclaimer, the term of this patent is extended or adjusted under 35 U.S.C. 154(b) by 743 days.

(21) Appl. No.: 10/270,039

(22) Filed: Oct. 11, 2002

(65) Prior Publication Data
US 2003/0095661 A1 May 22, 2003

(30) Foreign Application Priority Data
Oct. 15, 2001 (GB) .................. 0124681.8

(51) Int. Cl.
*H04L 29/00* (2006.01)
*H04L 9/00* (2006.01)
(52) U.S. Cl. .............. 713/153; 713/150; 713/151
(58) Field of Classification Search .................. None
See application file for complete search history.

(56) References Cited

U.S. PATENT DOCUMENTS

| 5,199,070 | A | 3/1993 | Matsuzaki et al. ............ 380/30 |
| 6,389,534 | B1* | 5/2002 | Elgamal et al. ............ 713/164 |
| 6,853,988 | B1 | 2/2005 | Dickinson et al. ............ 705/75 |
| 6,895,507 | B1 | 5/2005 | Teppler ............ 726/19 |
| 6,937,731 | B2* | 8/2005 | Chiu ............ 380/270 |
| 7,096,204 | B1 | 8/2006 | Chen et al. ............ 705/74 |
| 2002/0010772 | A1 | 1/2002 | Kusano ............ 709/223 |
| 2002/0032312 | A1 | 3/2002 | Deo et al. ............ 530/387.3 |
| 2002/0172367 | A1* | 11/2002 | Mulder et al. ............ 380/277 |
| 2003/0051129 | A1* | 3/2003 | Razdan et al. ............ 713/151 |
| 2004/0030652 | A1* | 2/2004 | Grunzig et al. ............ 705/51 |

FOREIGN PATENT DOCUMENTS

| EP | 354 774 A2 | 2/1990 |
| EP | 0 723 348 A2 | 7/1996 |
| EP | 0 851 629 A2 | 7/1998 |
| EP | 1 043 862 A2 | 10/2000 |
| JP | 2001-244924 | 9/2000 |
| WO | 96/05674 A1 | 2/1996 |
| WO | 01/06697 A2 | 1/2001 |
| WO | 01/11527 A2 | 2/2001 |

OTHER PUBLICATIONS

Cocks, C., "An Identity Based Encryption Scheme based on Quadratic Residues," Communications—Electronics Security Group, PO Box 144, Cheltenham GL52 5UE (4 pages).
Boneh, D., et al., "Identity-Based Encryption from the Weil Pairing," (pp. 1-30).
Krawczyk, H., "Secret Sharing Made Short", pp. 136-146, Springer Verlag (1998).
Menezes, A., et al., "Handbook of Applied Cryptography", Ch. 12, pp. 524-528 (1997).

* cited by examiner

*Primary Examiner*—Gilberto Barron, Jr.
*Assistant Examiner*—Kristin D. Sandoval
(74) *Attorney, Agent, or Firm*—Ladas & Parry LLP

(57) ABSTRACT

A method for encrypting data comprising deriving a public key using a first data set that defines an instruction; encrypting a second data set with the public key; providing the encrypted third data set to a recipient; providing the public key to a third party such that on satisfaction of the instruction the third party provides an associated private key to the recipient to allow decryption of the encrypted second data set.

5 Claims, 2 Drawing Sheets

METHOD AND APPARATUS FOR ENCRYPTING DATA

TECHNICAL FIELD

The present invention relates to a method and system for encrypting data.

BACKGROUND

Escrow and PKI encryption are two techniques that have been utilised to allow information to be removed from the control of the information owner while still preventing other parties having access to the information until a predetermined condition has been met.

Two common examples where these techniques have been used are in sealed bids and music distribution. Seal bids require that all bids are submitted by a specified date where the originator of the bid needs to be satisfied that their bid is not disclosed before the specified date. Music distributors may wish to publish their music on a public database, where the music distributors needs to be satisfied that the intended user of the music can not listen to the music until they have paid for the use of the music. However, the setting up and use of escrow and PKI encryption can be complex.

It is desirable to improve this situation.

SUMMARY OF THE INVENTION

In accordance with a first aspect of the present invention there is provided a method for encrypting data comprising deriving a public key using a first data set that defines an instruction and a second data set associated with the third party; encrypting a third data set with the public key; providing the encrypted third data set to a recipient; providing the public key to the third party such that on satisfaction of the instruction the third party provides an associated private key to the recipient to allow decryption of the encrypted third data set.

In accordance with a second aspect of the present invention there is provided a method for encrypting data comprising deriving a public key using a first data set that defines a term of an agreement and a second data set associated with a third party; encrypting a third data set with the public key; providing the encrypted third data set to a recipient; providing the public key to the third party such that on satisfaction of the term of the agreement the third party provides an associated private key to the recipient to allow decryption of the encrypted third data set.

Preferably a term of the agreement that needs to be satisfied is that the private key should not be released to the recipient until a specified date.

Preferably a term of the agreement that needs to be satisfied to allow release of the private key to the recipient is the making of a payment.

Most preferably the encrypted third data set includes a nonce.

In accordance with a third aspect of the present invention there is provided a computer system for encrypting data comprising a first computer entity for deriving a public key using a first data set that defines a term of an agreement and a second data set associated with a third party and encrypting a third data set with the public key; communication means for providing the encrypted data to a second computer entity and the public key to a third computer entity; wherein the third computer entity is arranged, on satisfaction of the term of the agreement, to provide an associated private key to the second computer entity to allow decryption of the encrypted third data set.

In accordance with a forth aspect of the present invention there is provided a computer system for encrypting data comprising a first computer node for deriving a public key using a first data set that defines an instruction and a second data set associated with the third party and encrypting a third data set with the public key; communication means for providing the encrypted data to a second computer node and the public key to a third computer node; wherein the third computer node is arranged, on satisfaction of the instruction to the third party, to provide an associated private key to the second computer node to allow decryption of the encrypted third data set.

In accordance with a fifth aspect of the present invention there is provided a computer apparatus for encrypting data comprising a processor for deriving a public key using a first data set that defines a term of an agreement and encrypting a second data set with the public key.

In accordance with a sixth aspect of the present invention there is provided a computer apparatus for encrypting data comprising a processor for deriving a public key using a first data set that defines an instruction and encrypting a second data set with the public key.

BRIEF DESCRIPTION OF THE DRAWINGS

For a better understanding of the present invention and to understand how the same may be brought into effect reference will now be made, by way of example only, to the accompanying drawings, in which.

DETAILED DESCRIPTION OF PREFERRED EMBODIMENTS OF THE PRESENT INVENTION

The present invention addresses the issue of controlling access to data, where the owner/originator of the relevant data wishes to place conditions on the access to the data. This is achieved by using a public key to encrypt the data where the public key itself stipulates the conditions under which access should be granted.

Figure 1:
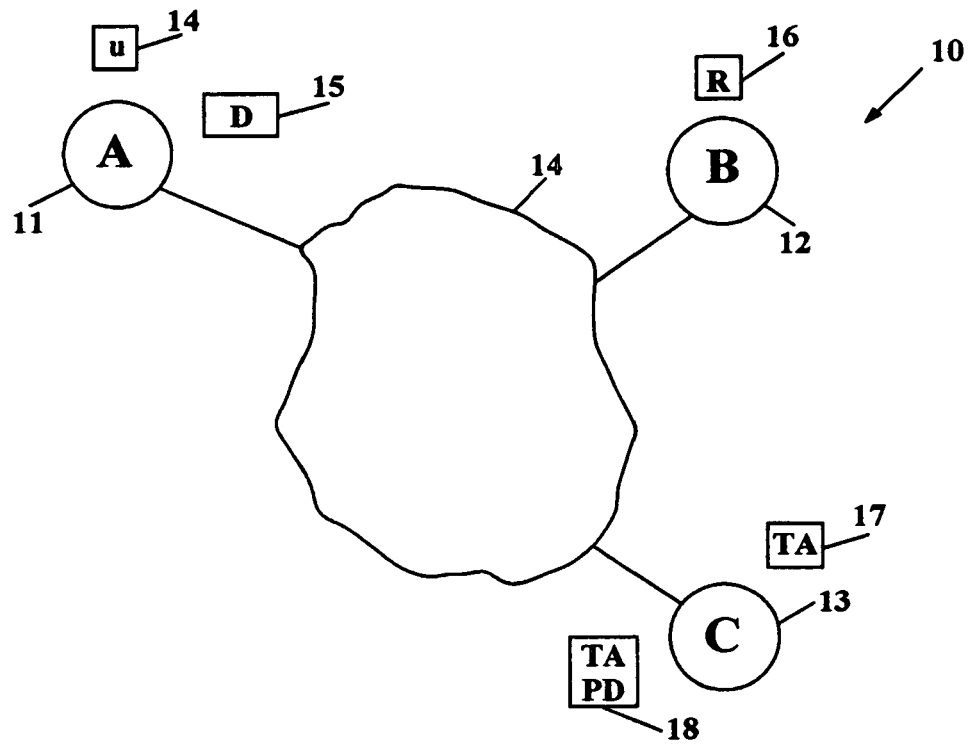
FIG. 1 illustrates a computer system according to an embodiment of the present invention.

FIG. 1 illustrates a computer system 10 according to an embodiment of the present invention. Computer system 10 includes a first computer entity 11, a second computer entity 12 and a third computer entity 13. Typically the three computer entities would be configured on separate computer platforms, however the computer entities 11, 12, 13 could be configured on a single computer platform. For the purposes of this embodiment, however, the three computer entities 11, 12, 13 are coupled via the internet 14.

Associated with the first computer entity 11 is a user 14 having data 15, for example a document, that they wish to make available, under certain conditions, to a third party. Associated with the second computer entity 12 is the intended recipient 16 of the data (i.e. the third party). Associated with the third computer entity 13 is a trust authority 17 (i.e. an authority that can be trusted by the user)

for determining whether the conditions required for access to the data 15 and stipulated by the user 14 have been met. Additionally, the trust authority 17 makes publicly available the trust authorities public data 18, as described below. As would be appreciated by a person skilled in the art the trust authorities public data 18 can be made available in a variety of ways, for example via a web site.

Having selected the trust authority 17 as the appropriate trust authority for the intended purpose the user obtains the trust authorities public data 18; typically the user will have a selection of trust authorities from which to choose the one most appropriate.

The user 14 defines the terms and conditions for allowing access to the data. This string (i.e. the public encryption key), or typically a digital representation of this string, is then used to encrypt the user's data 15 (i.e. the data the user 14 wishes to control access too), as described below.

The user's terms and conditions can be expressed in any suitable language, for example XML where the following example illustrates the use of XML to encapsulate possible terms and conditions:

```
<termsAndConditions nonce="12345">
    <or>
        <dateAfter value="01/01/02">
        <and>
            <amount value="12.52UKP" account="xyz"/>
            <or>
                <RequiredName name="NAME"/>
                <RequiredRole name="Manager"/>
            </or>
        </and>
    </or>
</termsAndConditions>
```

The use of 'dataAfter' is used to instruct the trust authority not to release the associated private key to the recipient until after the '01/01/02'. Additionally, the terms and conditions require that an amount '12.52UKP' be paid by the recipient 16 before the trust authority releases the associated private key to the recipient 16.

The trust authorities public data 18 includes a hash function # and a value N that is a product of two random prime numbers p and q, where the values of p and q are only known to the trust authority 17.

The hash function # has the function of taking a string and returning a value in the range 0 to N−1. Additionally, the hash function # should have the jacobi characteristics: jacobi (#, N)=1. That is to say, where $x^2 \equiv \#\mod N$ the jacobi (#, N)=−1 if x does not exist, and =1 if x does exist.

The values of p and q should ideally be in the range of $2^{511}$ and $2^{512}$ and should both satisfy the equation: $p,q \equiv 3 \mod 4$. However, p and q must not have the same value.

To encrypt each bit M of the user's data 15 the user 14 generates random numbers $t_+$ (where $t_+$ is an integer in the range $[0, 2^N)$) until the user 14 finds a value of $t_+$ that satisfies the equation $jacobi(t_+,N)=M$, where M represents the individual binary digits 0, 1 of the user's data 15 as −1, 1 respectively. The user 14 then computes the value:

$$s_+ \equiv (t_+ + \#(publickeystring)/t_+) \mod N.$$

for each bit M where $s_+$ corresponds to the encrypted bit of M.

In case #(publickeystring) is non-square the user 14 additionally generates additional random numbers $t_-$ (integers in the range $[0, 2^N)$) until the user 14 finds one that satisfies the equation $jacobi(t_-,N)=m$. The user 14 then computes the value:

$$s_- \equiv (t_- - \#(publickeystring)/t_-) \mod N$$

for each value of bit M.

The encrypted data, together with the identity of the trust authority 17 and the public key, are made available to intended recipient 16 by any suitable means, for example via e-mail or by being placed in a electronic public area.

The public key, together with the identity of the intended recipient 16, is also made available to the trust authority 17 by any suitable means. Consequently, the trust authority 17 is able to determine the terms and conditions that need to be satisfied to allow the trust authority 17 to issue the intended recipient 16 with the associated private key.

The trust authority 17 determines the associated private key B by solving the equation:

$$B^2 \equiv \#(publickeystring) \mod N$$

If a value of B does not exist, then there is a value of B that is satisfied by the equation:

$$B^2 \equiv -\#(publickeystring) \mod N$$

As N is a product of two prime numbers p, q it would be extremely difficult for any one to calculate the private key B with only knowledge of the public key string and N. However, as the trust authority 17 has knowledge of p and q (i.e. two prime numbers) it is relatively straightforward for the trust authority 17 to calculate B.

Any change to the public key will result in a private key that will not decrypt the document 15 correctly. Therefore, the intended recipient 16 cannot alter the public key before being supplied to the trust authority 17 and therefore cannot alter the relevant terms and conditions that apply to the release of the private key.

On receipt of the public key, the trust authority 17 checks whether the relevant terms and conditions have been met. When the trust authority 17 is satisfied that the terms and conditions have been met they supply the recipient 16 with the private key together with some indication of whether the public key is positive or negative.

If the square root of the encryption key returns a positive value, the users data M can be recovered using:

$$M = jacobi(s_+ + 2B, N).$$

If the square root of the encryption key returns a negative value, the users data M can be recovered using:

$$M = jacobi(s_- + 2B, N).$$

The recipient 16 then uses the appropriate equation above, in conjunction with the private key, to decrypt the message.

The recipient 16 may choose to cache the private key to decrypt the message 15 at a later date.

To prevent the reuse of the private key a nonce, i.e. a random number, can be incorporated into the terms and conditions. This ensures that the public key is unique thereby ensuring that the corresponding private key will also be unique.

Figure 2:
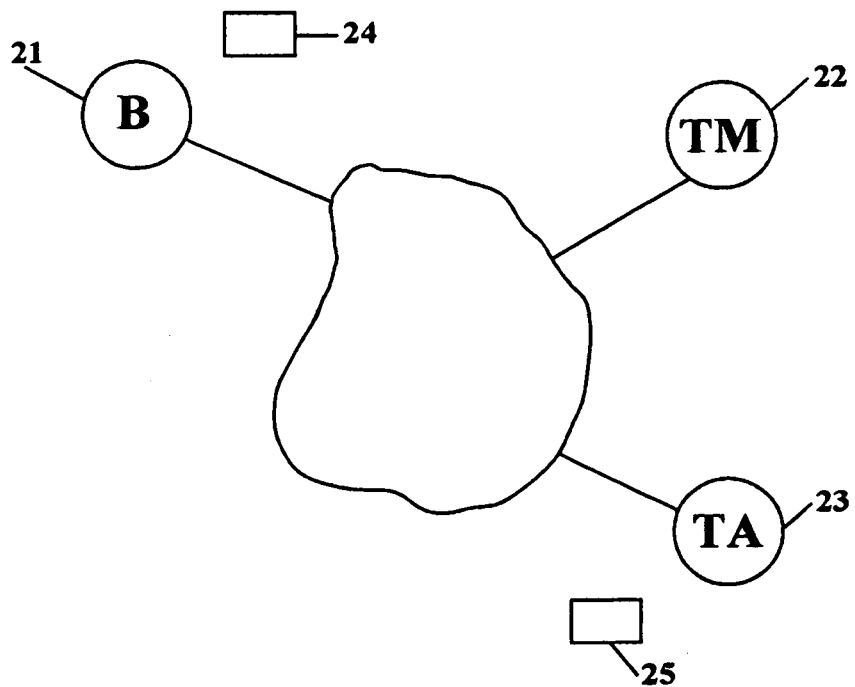
FIG. 2 illustrates a computer system arranged to support a sealed bid according to an embodiment of the present invention.

FIG. 2 illustrates the use of the present invention for the purposes of a seal bid arrangement, where bidder 21 provides authorization for the tender manager 22 to read the contents of the bidders seal bid 24 after a given data, for example once all bids have been received.

The bidder defines a set of terms and conditions using a suitable language, for example XML. The terms and conditions would include a date after which the bid details could be decrypted. For example:

```
<termsAndConditions nonce="1234">
    <and>
        <AccessorName name="NAME"/>
        <OpenAfter date="09:00 11/05/01"/>
    </and>
</termsAndConditions>
```

This string would be used as the public key to encrypt the document, in conjunction with the appropriate trust authorities 23 public details 25. The public key and the encrypted document would then be made available to the tender manager 22 by any suitable means.

In order for the tender manager 22 to obtain the respective private key the tender manager 22 sends the public key to the appropriate trust authority 23. The trust authority 23 would check that the requester is the named tender manager and that the current date is after 09:00 Nov. 5, 2001. Only when these conditions have been satisfied would the trust authority 23 release the private key, derived in accordance with the principles describe above. The nonce is included to ensure that the trust manager 23 will not have seen a public key identical to this in the past—and hence is not able to reuse an existing private key.

This embodiment only refers to a single trust authority, however, each bidder might choose a trust authority of their own choosing. The tender manager would then have to go to the appropriate trust authority to obtain the private key.

The language used to define the terms and conditions would be selected to allow expression of a variety of terms and conditions.

Figure 3:
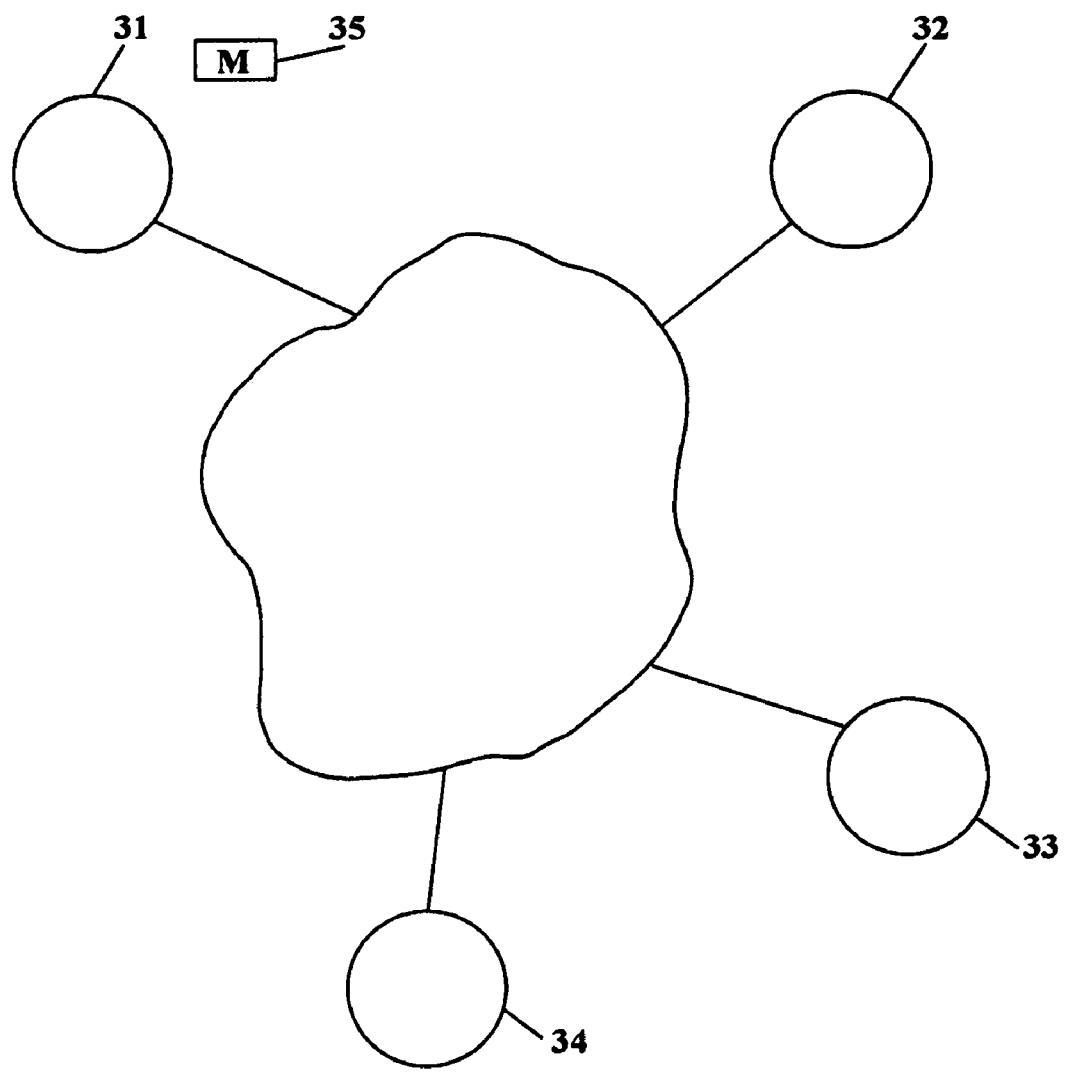
FIG. 3 illustrates a computer system arranged to support a music distribution system according to an embodiment of the present invention.

FIG. 3 illustrates the use of the present invention for the purposes of enabling electronic distribution of music, where a music provider 31 provides authorization for a recipient 32 to listen to the music after a specified payment has been made.

The prospective recipient 32 would retrieve the encrypted music, together with the public key used to encrypt the music 35 and the name of the appropriate trust authority 33. The encrypted music could be access, for example, via a public electronic database (not shown).

The public key might have the format:

```
<termsAndConditions nonce="1245">
    <Amount value="12.45UKP" account="xyz"/>
</termsAndConditions>
```

That is to say, the private key should only be release after the recipient 32 has paid a specified sum of money into a specified bank account 34.

In order for the music to be played it must be decrypted, which requires providing the public key to the appropriate trust authority 33, who can then determine what conditions have to be satisfied to allow release of the appropriate private key.

Any attempt on the part of the recipient to modify the terms and conditions would result in a public key that does not decrypt the music.

What is claimed:

1. A method for encrypting data comprising: encrypting a second data set with a public key comprising a first data set that defines a term of an agreement; providing the encrypted second data set to a recipient; providing the public key to a third party such that on satisfaction of the term of the agreement the third party provides an associated private key to the recipient to allow decryption of the encrypted second data set.

2. A method according to claim 1, wherein said term of the agreement that needs to be satisfied to allow release of the private key to the recipient is the making of a payment.

3. A method according to claim 1, wherein the second data set includes a nonce.

4. A computer system for encrypting data comprising a first computer entity for encrypting a second data set with a public key comprising a first data set that defines a term of an agreement; communication means for providing the encrypted data to a second computer entity and the public key to a third computer entity; wherein the third computer entity is arranged, on satisfaction of the term of the agreement, to provide an associated private key to the second computer entity to allow decryption of the encrypted second data set.

5. A computer apparatus for encrypting data comprising:
   a processor arranged to encrypt a second data set using a public key; arid
   a communication arrangement for outputting the encrypted second data set for provision to a recipient;
   wherein the public key comprises a first data set that defines a term of an agreement that is to be checked by a third party as being satisfied by said recipient before the third party provides the recipient with a private key for decrypting the encrypted second data set.

\* \* \* \* \*